US012744248B2

(12) United States Patent
Ding et al.

(10) Patent No.: US 12,744,248 B2
(45) Date of Patent: Sep. 22, 2026

(54) LITHIUM BATTERY ELECTROLYTE

(71) Applicant: AGENCY FOR SCIENCE, TECHNOLOGY AND RESEARCH, Singapore (SG)

(72) Inventors: Ning Ding, Singapore (SG); Xuesong Yin, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 586 days.

(21) Appl. No.: 18/266,258

(22) PCT Filed: Dec. 2, 2021

(86) PCT No.: PCT/SG2021/050746
§ 371 (c)(1),
(2) Date: Jun. 8, 2023

(87) PCT Pub. No.: WO2022/124985
PCT Pub. Date: Jun. 16, 2022

(65) Prior Publication Data

US 2024/0097192 A1 Mar. 21, 2024

(30) Foreign Application Priority Data

Dec. 8, 2020 (SG) ........................... 10202012244X

(51) Int. Cl.
*H01M 10/0568* (2010.01)
*H01M 10/0525* (2010.01)
*H01M 10/0569* (2010.01)

(52) U.S. Cl.
CPC ... *H01M 10/0568* (2013.01); *H01M 10/0525* (2013.01); *H01M 10/0569* (2013.01); *H01M 2300/0037* (2013.01)

(58) Field of Classification Search
CPC ......... H01M 10/0568; H01M 10/0569; H01M 2300/0037
See application file for complete search history.

(56) References Cited

U.S. PATENT DOCUMENTS 6,168,884 B1 1/2001 Neudecker et al.
7,820,323 B1 * 10/2010 Zhang .............. H01M 10/0568 429/188

(Continued)

FOREIGN PATENT DOCUMENTS

CN 108336411 A 7/2018
CN 108987810 * 12/2018

(Continued)

OTHER PUBLICATIONS

English translation of CN Publication 108987810, Dec. 2018.*

(Continued)

*Primary Examiner* — Brittany L Raymond
(74) *Attorney, Agent, or Firm* — WOMBLE BOND DICKINSON (US) LLP

(57) ABSTRACT

The present invention relates to an electrolyte comprising lithium difluoro(oxalate)borate (LiDFOB) and a carbonate solvent, wherein LiDFOB is present at a concentration in the range of 1.5 M to 3 M, a rechargeable battery comprising the electrolyte as described herein, a cathode layer, an anode layer and a separator, and a method of preparing the electrolyte as described herein, comprising the step of dissolving LiDFOB in a carbonate solvent, wherein LiDFOB is present at a concentration in the range of 1.5 M to 3 M.

17 Claims, 15 Drawing Sheets

(56) References Cited

U.S. PATENT DOCUMENTS

2016/0261000 A1 9/2016 Zhang et al.
2019/0372165 A1* 12/2019 Sakamoto ......... H01M 10/0568
2020/0220220 A1 7/2020 Martin et al.

FOREIGN PATENT DOCUMENTS

CN 108987810 A 12/2018
WO WO2020146395 A1 7/2020

OTHER PUBLICATIONS

Yu et al., "Concentrated LiODFB Electrolyte for Lithium Metal Batteries," Frontiers in Chemistry, vol. 7, Jul. 2019, 8 pages.
Song et al., "LiPO2F2 as a LiPF6 Stabilizer Additive to Improve the high-temperature Performance of the NCM811/SiOx@C Battery," International Journal of Electrochemical Science, Aug. 5, 2019, 11 pages.
Sun et al., "Stabilized Li3N for efficient battery cathode prelithiation," Department of Materials Science and Engineering, Stanford University, Aug. 22, 2016, 6 pages.
Schedlbauer, et al., "Lithium difluoro(oxalato)borate: A promising salt for lithium metal based secondary batteries?," Elsevier, Electrochimica Acta 92 (2013), 6 pages.
Weber et al., "Long cycle life and dendrite-free lithium morphology in anode-free lithium pouch cells enabled by a dual-salt liquid electrolyte," Nature Energy, vol. 4, Aug. 2019, 7 pages.
Louli, A. J. et al., "Diagnosing and correcting anode-free cell failure via electrolyte and morphological analysis," Nature Energy, vol. 5, Sep. 2020, 10 pages.
Niu, Chaojiang et al., "High-energy lithium metal pouch cells with limited anode swelling and long stable cycles," Nature Energy, vol. 4, Jul. 2019, 9 pages.
International Search Report for PCT International Application No. PCT/SG2021/050746, mailed Feb. 7, 2022, 3 pages.
International Preliminary Report on Patentability for PCT International Application No. PCT/SG2021/050746, issued Jun. 13, 2023, 6 pages.
Written Opinion for PCT International Application No. PCT/SG2021/050746, mailed Feb. 7, 2022, 5 pages.
Search Report and Written Opinion issued Mar. 28, 2024 in Singapore Patent Application No. 11202303910W.

* cited by examiner

LITHIUM BATTERY ELECTROLYTE

CROSS-REFERENCE TO RELATED APPLICATIONS

The present application is a US national phase application under 35 USC § 371 of International Application No. PCT/SG2021/050746, filed Dec. 2, 2021, which claims priority to Singapore patent application 10202012244X, filed Dec. 8, 2020.

TECHNICAL FIELD

The present invention relates to an electrolyte comprising lithium difluoro(oxalate)borate (LiDFOB) and a carbonate solvent, wherein LiDFOB is present at a concentration in the range of 1.5 M to 3 M, a rechargeable battery comprising the same and a method of preparing the same.

BACKGROUND ART

Lithium-ion (Li-ion) battery technology has been rapidly developed in the past three decades since first launched by Sony in 1991. Li-ion battery is now the dominant energy storage device in portable electronics and electric vehicles because of its high energy density and long cycle life. However, as the lithium storage capacity of the cathode and anode is limited, a bottleneck in energy density (~300 Wh/kg) can be foreseen if the battery chemistry is not changed in the development of next-generation high-energy batteries.

To solve the issue, battery scientists have been developing lithium metal and anode-free rechargeable batteries. Different from the conventional Li-ion batteries with graphite as the anode material, which has a theoretical specific capacity of merely 372 mAh/g, lithium metal can deliver over ten times of specific capacity (3860 mAh/g). Theoretically, anode-free batteries can even provide an infinite anode capacity. The comparison of these three batteries known in the prior art is shown in FIG. 1. All three types of the batteries in FIG. 1 use exactly the same cathode (i.e., 80 μm thick, coated on Al foil). The main difference lies in the thickness of the anode. In a conventional Li-ion battery (FIG. 1(*a*)), to store lithium from the cathode, a thick graphite layer (100 μm) is coated on a Cu foil (forming $LiC_6$ alloy after lithiation). In contrast, in a lithium metal battery (FIG. 1(*b*)), the graphite and Cu foil are replaced by a 50 μm lithium foil, which works as the current collector and the lithium reservoir to compensate the irreversible capacity loss during cycling. Since the anode thickness is only half of the conventional Li-ion battery, the lithium metal battery is expected to deliver higher energy density. A prototype lithium metal pouch cell with an energy density of 300 Wh/kg has been successfully demonstrated.

Due to the poor mechanical properties of lithium, it is difficult to further decrease the thickness of lithium foil, and the highly reactive nature of lithium which is sensitive to moisture, oxygen, carbon dioxide and even nitrogen, further hinders its commercial adoption. On the other hand, since all the active lithium source in a Li metal battery is from the cathode (using a lithium-intercalated cathode), the anode can be completely replaced by a 6 μm Cu foil, if reversible lithium plating could be achieved. Such cell design (FIG. 1(*c*)) could significantly boost the volumetric energy density to 1200 Wh/L and increase the gravimetric energy density to 400 Wh/kg.

Nevertheless, to date, direct plating of lithium on Cu foil still has disadvantages such as growth of lithium dendrites, which form a "dead" lithium layer following the stripping (or discharge) process (FIG. 2). As a result, anode-free batteries suffer from much faster capacity decay than Li-ion batteries, and typically have a limited cycle life of less than 20 cycles.

In view of the limitations of current lithium batteries, there is a need for development of a rechargeable lithium battery that overcomes or at least ameliorates, one or more of the disadvantages described above.

SUMMARY

In an aspect, there is provided an electrolyte comprising lithium difluoro(oxalate)borate (LiDFOB) and a carbonate solvent, wherein LiDFOB is present at a concentration in the range of 1.5 M to 3 M.

Advantageously, the electrolyte as defined above comprises a high concentration of LiDFOB. This concentration may be significantly higher than in conventional electrolytes, and the electrolyte may be used in a battery to confer high cycling performance. Advantageously, the high concentration of the LiDFOB in the range of 1.5 M to 3 M may retain the battery's specific capacity at high cycle numbers. The good thermal stability of the electrolyte may further advantageously allow smooth lithium plating of the counter electrode on the anode side or the anode at an elevated temperature. The use of the electrolyte as defined above may facilitate a capacity retention of 65% for an anode-free battery after 100 cycles or 70% for a battery with a lithium metal anode after 200 cycles.

Further advantageously, the electrolyte as defined above may have a high cycling stability even when heated to a temperature of up to at least 80° C. Therefore, when the electrolyte as defined above is used in an electrochemical cell and operating at an elevated temperature in the range of, for example 40° C. to 60° C., the electrolyte may still be stable, in contrast to conventionally used solvents such as fluoroethylene carbonate (FEC) which may degrade at temperatures as low as 40° C. A cell operating at elevated temperatures with the electrolyte as defined above, may exhibit about 5% higher specific capacity and about 50% lower electrochemical impedance than a cell operating at room temperature.

Further advantageously, the electrolyte comprising the carbonate solvent as defined above may have better cycling properties compared to, for example, an electrolyte comprising an ether. Ether-based electrolytes may not be suitable in applications with high energy cathodes operating at a voltage above 4.0 V due to a narrow voltage stability window. However, the electrolyte as defined above may advantageously be suitable for such applications.

Further advantageously, the electrolyte as defined above may facilitate reversible and smooth lithium plating of a counter electrode on the anode side or an anode when used in a cell, which may further contribute to the high cycling performance of the cell.

More advantageously, it may be the combination of the specific concentration of LiDFOB and the carbonate solvent as defined above that confers the advantages to the electrolyte as outlined above.

In another aspect, there is provided a rechargeable battery comprising the electrolyte as described herein, a cathode layer, an anode layer and a separator.

Advantageously, the rechargeable battery as defined herein may have a high capacity of up to 2.8 Ah. Further, advantageously, the rechargeable battery as defined above may have a high energy density and specific energy. This may be due to the absence of a thick graphite layer or a thick lithium layer as an anode in the battery, which may in turn be due to the electrolyte as defined above facilitating a reversible and smooth lithium plating of a counter electrode on the anode side or an anode in the cell.

Further advantageously, the rechargeable battery as defined above may exhibit similar or better performance as batteries comprising a dual-salt electrolyte, even if a dual-salt electrolyte is not used. That is, the rechargeable battery as defined above may achieve just as high or better performance as a battery using a dual-salt electrolyte, even when only a single-salt electrolyte is used.

In another aspect, there is provided a method of preparing the electrolyte as described herein, comprising the step of dissolving LiDFOB in a carbonate solvent, wherein LiDFOB is present at a concentration in the range of 1.5 M to 3 M.

Advantageously, the method as defined above circumvents the use of conventionally used solvents such as fluroethylenecarbonate (FEC) which are expensive, and require to be stored at low temperature in the range of 2° C. to 8° C. The method as defined above further circumvents the use of ether solvents which may have a narrow voltage stability window. Advantageously, the method may produce an electrolyte with high thermal stability. The electrolyte may be stably heated to at least 80° C. The method as described above may therefore allow the electrolyte to be prepared using reagents that can be stored at room temperature or above, making the method of preparation significantly more convenient, while maintaining a high performance of the electrolyte.

Further advantageously, the method may produce an electrolyte suitable for use in a rechargeable battery with high cycling stability. The use of the electrolyte may have a capacity retention of 65% for an anode-free battery after 100 cycles or 70% for a battery with a lithium metal anode after 200 cycles.

Definitions

The following words and terms used herein shall have the meaning indicated:

"Electrolyte" for the purposes of this disclosure refers to a medium comprising ions dissolved in a liquid that conducts cations between two or more electrodes when a voltage is applied.

"Alkyl" as a group or part of a group refers to a straight or branched aliphatic hydrocarbon group, preferably a $C_1$-$C_6$ alkyl unless otherwise noted. Examples of suitable straight and branched $C_1$-$C_6$ alkyl substituents include methyl, ethyl, n-propyl, 2-propyl, n-butyl, sec-butyl, t-butyl, hexyl, heptyl, octyl and the like. The group may be a terminal group or a bridging group.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF OPTIONAL EMBODIMENTS

There is provided an electrolyte comprising lithium difluoro(oxalate)borate (LiDFOB) and a carbonate solvent, wherein LiDFOB is present at a concentration in the range of 1.5 M to 3 M.

The carbonate solvent may be a cyclic carbonate solvent, such as propylene carbonate and ethylene carbonate. The cyclic carbonate solvent may be a non-fluorinated cyclic carbonate solvent.

Non-fluorinated cyclic carbonate solvents may advantageously have a high thermal stability, which may facilitate the electrolyte to have a high cycling stability even when heated to a temperature of up to at least 80° C., in comparison with conventionally used fluorinated cyclic carbonate solvents such as fluoroethylene carbonate (FEC) which may decompose at a temperature of at least or about 40° C.

The non-fluorinated cyclic carbonate solvent may dissolve the LiDFOB and may be safely stored and handled at a temperature of above 40° C. The non-fluorinated cyclic carbonate solvent may be an ethylene carbonate wherein the carbon atoms of the ethylene group are independently optionally substituted with an alkyl group. The alkyl group may be branched or linear a $C_1$ to $C_6$, $C_1$ to $C_2$, $C_1$ to $C_4$, $C_2$ to $C_4$, $C_3$ to $C_6$ or $C_4$ to $C_6$ alkyl. The alkyl group may be selected from the group consisting of methyl, ethyl, n-propyl, isopropyl, n-butyl, sec-butyl, isobutyl, tert-butyl, n-pentyl, tert-pentyl, neopentyl, isopentyl, sec-pentyl, 3-pentyl, sec-isopentyl, active pentyl and n-hexyl.

Non limiting examples of the non-fluorinated cyclic carbonate solvent may include ethylene carbonate (EC), propylene carbonate (PC) or combinations thereof.

The cyclic carbonate may be ethylene carbonate. When ethylene carbonate is being used, it may be melted at a temperature in the range of about 55° C. and about 65° C., before use.

The cyclic carbonate may be propylene carbonate. Propylene carbonate may be suitable for use in the electrolyte as defined above for having a low melting point, low viscosity and good solubility properties.

Propylene carbonate may further facilitate better cycling stability compared to, for example, an ether-based electrolyte.

The LiDFOB may have a concentration in the range of about 1.5 M to about 3 M, about 2 M to about 3 M, about 2.5 M to about 3 M, about 1.5 M to about 2.5 M or about 1.5 M to about 2 M.

The electrolyte may consist essentially of LiDFOB and a carbonate solvent.

The electrolyte may further comprise a co-solvent.

The co-solvent may be an acyclic carbonate, an ester, an ether or a mixture thereof, each miscible with the carbonate solvent for the battery performance optimization. Non-limiting examples of the co-solvent may include dimethyl carbonate (DMC), diethyl carbonate (DEC), ethyl methyl carbonate (EMC), gamma-Butyrolactone (GBL), 1,2-dimethyoxyethane (DME) or combinations thereof.

The solvent and the co-solvent may have a volume ratio in the range of about 8:2 to about 1:9, about 7:3 to about 1:9, about 5:5 to about 1:9, about 3:7 to about 1:9, about 8:2 to about 3:7, about 8:2 to about 5:5 or about 8:2 to about 7:3.

The electrolyte may consist essentially of LiDFOB, a carbonate solvent and a co-solvent.

The electrolyte may further comprise an additional salt. The additional salt may be selected from the group consisting of $LiBF_4$, $LiPF_6$, $LiAsF_6$, $LiClO_4$, lithium bis(oxalate) borate (LiBOB), lithium difluorophosphate ($LiPO_2F_2$), lithium difluorobis(oxalato)phosphate (LiDODFP), lithium bis(fluorosulfonyl)imide (LiFSI), lithium bis(trifluoromethanesulfonyl)imide (LiTFSI), lithium trifluoromethanesulfonate (LiOTf), magnesium trifluoromethanesulfonate (MgOTf), aluminum trifluoromethanesulfonate (AlOTf), barium trifluoromethanesulfonate (BaOTf), praseodymium (III) trifluoromethanesulfonate (PrOTf), $Mg(ClO_4)_2$, $NaClO_4$, $Ba(ClO_4)_2$, $Li_2Cr_2O_7$, tetrabutylammonium bis(trifluoromethanesulfonyl)imide (TBATFSI), sodium bis(trifluoromethanesulfonyl)imide (NaTFSI), magnesium bis(trifluoromethanesulfonyl)imide (MgTFSI), magnesium phthalocyanine (MgPc), cesium trifluoromethanesulfonate (CsOTf) and any mixture thereof.

The electrolyte may comprise only LiDFOB as a lithium salt. The electrolyte may not comprise lithium salts other than LiDFOB. The electrolyte may not comprise two or more lithium salts.

The electrolyte may be a single-salt electrolyte.

The electrolyte may not comprise $LiBF_4$.

Where the electrolyte does not contain other lithium salts, the additional salt may be selected from the group consisting of magnesium trifluoromethanesulfonate (MgOTf), aluminum trifluoromethanesulfonate (AlOTf), barium trifluoromethanesulfonate (BaOTf), praseodymium(III) trifluoromethanesulfonate (PrOTf), $Mg(ClO_4)_2$, $NaClO_4$, $Ba(ClO_4)_2$, tetrabutylammonium bis(trifluoromethanesulfonyl)imide (TBATFSI), sodium bis(trifluoromethanesulfonyl)imide (NaTFSI), magnesium bis(trifluoromethanesulfonyl)imide (MgTFSI), magnesium phthalocyanine (MgPc), cesium trifluoromethanesulfonate (CsOTf) and any mixture thereof.

The concentration of the additional salt may be in the range of about 10 μM to about 2 M, about 100 μM to about 2 M, about 1 mM to about 2 M, about 10 mM to about 2 M, about 100 mM to about 2 M, about 1 M to about 2 M, about 10 μM to about 1 M, about 10 μM to about 100 mM, about 10 μM to about 10 mM, about 10 μM to about 1 mM or about 10 μM to about 100 μM.

The electrolyte may consist essentially of LiDFOB, a carbonate solvent, a co-solvent and an additional salt.

The electrolyte may have a water content in the range of about 0 ppm to about 1000 ppm, about 0 ppm to about 500 ppm, about 0 ppm to about 100 ppm, about 0 ppm to about 50 ppm, about 0 ppm to about 20 ppm, about 0 ppm to about 10 ppm or about 0 ppm to about 5 ppm.

There is also provided a rechargeable battery comprising the electrolyte as described herein, a cathode layer, an anode layer and a separator.

The rechargeable battery may further comprise a case. Non-limiting examples of the case may include a cylindrical cell case, button cell case, prismatic cell case or pouch cell case.

The cathode layer may comprise a cathode, and an aluminium foil or conductive mesh.

The cathode layer may comprise the cathode and the aluminium foil, or the cathode and the conductive mesh.

The cathode may comprise a cathode material, a conductive additive and a polymer binder.

The conductive mesh may comprise stainless steel or nickel foam.

Non-limiting examples of the cathode material may include nickel cobalt manganese oxides (NCM), nickel cobalt aluminium oxides (NCA), lithium cobalt oxide, lithium manganese oxide, lithium iron phosphate, or combinations thereof.

The NCM may have a chemical formula of $Li(Ni_xCo_yMn_z)O_2$, wherein x is a number in the range of 0.3 to 0.98;
y is a number in the range of 0.01 to 0.5;
z is a number in the range of 0.01 to 0.5; and
with the proviso that x+y+z=1.

The NCM may have a chemical formula of $Li_{1+\sigma}(Ni_xCo_yMn_z)O_2$, wherein σ is a number in the range of 0.01 to 0.3
x is a number in the range of 0.01 to 0.98;
y is a number in the range of 0.01 to 0.5;
z is a number in the range of 0.01 to 0.5; and
with the proviso that x+y+z=1.

The NCA may have a chemical formula of $Li(Ni_xCo_yAl_z)O_2$, wherein x is a number in the range of 0.3 to 0.98;
y is a number in the range of 0.01 to 0.3;
z is a number in the range of 0.01 to 0.2; and
with the proviso that x+y+z=1.

Non-limiting examples of the conductive additive may include carbon black, carbon nanotubes, graphene or combinations thereof.

Non-limiting examples of the carbon black may include Denka black, Ketjenblack, Super C65, TIMCAL TIMREX® KS6 or any combination thereof.

Non-limiting examples of the polymer binder may include polyvinylidene fluoride (PVDF), poly-o-methoxyaniline (POMA), poly(3,4-ethylenedioxythiophene) (PEDOT), polyaniline (PANT), polyacrylonitrile (PAN), poly(acrylic acid) (PAA) or any combination thereof.

The NCM may have a weight percentage in the range of about 80 weight % to about 99.8 weight %, about 85 weight % to about 99 weight %, about 90 weight % to about 98 weight % or about 95 weight % to about 97 weight %, based on the total weight of the cathode. Preferably, the NCM may have a weight percentage in the range of about 92 weight % to about 97 weight %.

The conductive additive may have a weight percentage in the range of about 0.1 weight % to about 10 weight %, about 0.5 weight % to about 8 weight %, about 1 weight % to about 6 weight %, about 2 weight % to about 4 weight % or about 2 weight % to about 3 weight %, based on the total weight of the cathode. Preferably, the conductive additive may have a weight percentage in the range of about 2 weight % to about 5 weight %.

The polymer binder may have a weight percentage in the range of about 1 weight % to about 10 weight %, about 2 weight % to about 8 weight %, about 4 weight % to about 6 weight %, about 2 weight % to about 6 weight % or about 2 weight % to about 4 weight %, based on the total weight of the cathode.

The cathode may be loaded on one side or two sides of the aluminium foil at a loading density in the range of about 5 $mg/cm^2$ to about 100 $mg/cm^2$, about 10 $mg/cm^2$ to about 80 $mg/cm^2$, about 20 $mg/cm^2$ to about 60 $mg/cm^2$, about 20 $mg/cm^2$ to about 40 $mg/cm^2$, about 25 $mg/cm^2$ to about 40 $mg/cm^2$, about 5 $mg/cm^2$ to about 30 $mg/cm^2$, about 10 $mg/cm^2$ to about 30 $mg/cm^2$, about 15 $mg/cm^2$ to about 30 $mg/cm^2$, about 20 $mg/cm^2$ to about 30 $mg/cm^2$, about 25 $mg/cm^2$ to about 30 $mg/cm^2$, about 5 $mg/cm^2$ to about 20 $mg/cm^2$, about 10 $mg/cm^2$ to about 20 $mg/cm^2$, about 15 $mg/cm^2$ to about 20 $mg/cm^2$, about 5 $mg/cm^2$ to about 15 $mg/cm^2$, about 10 $mg/cm^2$ to about 20 $mg/cm^2$, or about 5 $mg/cm^2$ to about 10 $mg/cm^2$, based on the loaded NCM on one side of the aluminium foil. Preferably, the loading density may be in the range of about 16 $mg/cm^2$ to about 25 $mg/cm^2$.

The cathode may be pressed on the conductive mesh at a loading density in the range of about 100 $mg/cm^2$ to 2 $g/cm^2$, about 100 $mg/cm^2$ to about 1.5 $g/cm^2$, about 200 $mg/cm^2$ to about 1.2 $g/cm^2$, or about 500 $mg/cm^2$ to about 1 $g/cm^2$, based on loaded NCM.

If the cathode is pressed on the conductive mesh, then a much higher loading may be achieved.

The term "anode layer" may refer to a counter electrode on the anode side, charge collector on the anode side or an anode.

The anode layer may comprise copper, nickel, titanium, stainless steel, lithium or a mixture thereof.

The anode layer may comprise a copper foil, lithium metal or a lithium film.

The copper foil may have a thickness in the range of about 2 μm to about 25 μm, about 4 μm to about 20 μm, about 6 μm to about 12 μm, about 8 μm to about 12 μm, about 2 μm to about 8 μm, about 2 μm to about 6 μm or about 2 μm to about 4 μm. Preferably, the copper foil may have a thickness in the range of about 4 μm to about 12 μm.

The lithium film may have a thickness in the range of about 2 μm to about 100 μm, about 2 μm to about 5 μm, about 2 μm to about 10 μm, about 2 μm to about 20 μm, about 2 μm to about 50 μm, about 5 μm to about 10 μm, about 5 μm to about 20 μm, about 5 μm to about 50 μm, about 5 μm to about 100 μm, about 10 μm to about 20 μm, about 10 μm to about 50 μm, about 10 μm to about 100 μm, about 20 μm to about 50 μm, about 20 μm to about 100 μm, or about 50 μm to about 100 μm. Preferably, the lithium film may have a thickness in the range of about 20 μm to about 50 μm.

The separator may comprise a thin porous film of an insulating material. Non-limiting examples of the insulating material include polyethylene, polypropylene, polysulfone, cellulose, nylon or combinations thereof.

The separator may have a thickness in the range of about 10 μm to about 40 μm, about 15 μm to about 35 μm, about 20 μm to about 30 μm, about 25 μm to about 30 μm, about 10 μm to about 25 μm, about 10 μm to about 20 μm, about 10 μm to about 15 μm.

The separator may have a pore size in the range of about 10 nm to about 10 μm, about 50 nm to about 10 μm, about 200 nm to about 10 μm, about 500 nm to about 5 μm, about 50 nm to about 2 μm, about 10 nm to about 1 μm or about 10 nm to about 500 nm.

The rechargeable battery may further comprise the pouch cell case.

The cathode layer may further comprise a cathode connection part to connect the cathode and the pouch cell case. The cathode may have a dimension of 48 mm×70 mm. The anode layer may further comprise a connection part to connect the anode layer and the pouch cell case. The anode layer may have a dimension of 53 mm×75 nm with 4 mm and may further comprise an anode connection part.

The cathode connection part may be an aluminium tab having a width of about 4 mm. The anode connection part may be a nickel tab having a width of about 4 mm. Typically, the cathode connection part may be an aluminium tab and the anode connection part may be a nickel tab. Aluminium may be unstable at the anode connection part.

The rechargeable battery may further comprise the button cell case. The button cell case may have a button shape with a set of diameter×height. Non-limiting examples of the set of diameter×height include 20 mm×3.2 mm (CR2032), 20 mm×1.6 mm (CR2016), 12 mm×2.0 mm (CR1220), 16 mm×2.0 mm (CR1620), 23 mm×2.5 mm (CR2325) or 20 mm×2.5 mm (CR2025).

The set of diameter×height of the button cell case may be CR2032. The cathode layer may have a diameter in the range of about 8 mm to about 16 mm, about 10 mm to about 16 mm, about 12 mm to about 16 mm, about 14 mm to about 16 mm, about 8 mm to about 14 mm, about 8 mm to about 12 mm or about 8 mm to about 10 mm. The anode layer may have a diameter in the range of about 12 mm to about 20 mm, about 14 mm to about 20 mm, about 16 mm to about 20 mm, about 18 mm to about 20 mm, about 12 mm to about 18 mm, about 12 mm to about 16 mm or about 12 mm to about 14 mm.

In the rechargeable battery, the anode layer may have a larger size than the cathode layer.

Advantageously, the anode layer with the larger size may effectively hold lithium when the rechargeable battery is charging.

In the rechargeable battery, the separator may be placed between the cathode layer and the anode layer.

The rechargeable battery may comprise multiple cathode layers, multiple anode layers and multiple separators. The multiple cathode layers and the multiple anode layers may be placed in an alternating stack wherein adjacent layers may have different types. The adjacent layers may be separated by the separator.

The multiple cathode layers, multiple anode layers or multiple separators may have a number in the range of about 2 to about 20, about 5 to about 20, about 10 to about 20, about 15 to about 20, about 2 to about 15, about 2 to about 10 or about 2 to about 5.

The rechargeable battery may be operated at a voltage in the range of about 2.5 V to about 5.0 V, about 2.5 V to about 3.5 V, about 2.5 V to about 4.0 V, about 3.5 V to about 4.0 V, about 3.5 V to about 4.0 V or about 4.0 V to about 5.0 V. Preferably, the rechargeable battery may be operated at a voltage in the range of about 2.8 V to about 4.5 V.

The rechargeable battery may be charged or operated at a temperature in the range of about 30° C. to about 90° C., about 30° C. to about 40° C., about 30° C. to about 50° C., about 30° C. to about 60° C., about 30° C. to about 70° C., about 30° C. to about 80° C., about 40° C. to about 50° C., about 40° C. to about 60° C., about 40° C. to about 70° C., about 40° C. to about 80° C., about 40° C. to about 90° C., about 50° C. to about 60° C., about 50° C. to about 70° C., about 50° C. to about 80° C., about 50° C. to about 90° C., about 60° C. to about 70° C., about 60° C. to about 80° C., about 60° C. to about 90° C., about 70° C. to about 80° C., about 70° C. to about 90° C., or about 80° C. to about 90° C. Preferably, the rechargeable battery may be charged or operated at a temperature in the range of about 40° C. to about 80° C.

There is also provided a method of preparing the electrolyte as described herein comprising the step of dissolving LiDFOB in a carbonate solvent, wherein LiDFOB is present at a concentration in the range of 1.5 M to 3 M.

The method may further comprise a step of drying the LiDFOB or the carbonate solvent before the dissolving step.

In the drying step, the LiDFOB may be heated at a temperature of at least about 120° C., at least about 150° C. or at least about 200° C., and at most at about 300° C., for a duration of at least about 5 hours, at least about 12 hours, at least about 24 hours and at most about 48 hours.

In the drying step, the carbonate solvent may be dried with a desiccant for a duration of at least 48 hours, at least about 72 hours and at most about 1 week.

Advantageously, the drying step may lead to less water content in the electrolyte, which is suitable for use in a rechargeable battery.

The method may further comprise a mixing step before the dissolving step wherein the carbonate solvent is mixed with a co-solvent.

Advantageously, the electrolyte may yield improved battery cycling stability.

The method may further comprise, before the mixing step, the step of protecting the LiDFOB, the solvent and the co-solvent with an inert gas or ultra dry air. Here, the protecting step may be performed using a glovebox. The ultra dry air may have a dew point of less than −40° C.

Non-limiting examples of the inert gases may include helium, nitrogen, argon or combinations thereof.

The method may further comprise an adding step before or after the dissolving step, wherein an additional salt is added into the electrolyte.

There is also provided a method of preparing a rechargeable battery comprising the steps of:

1) stacking a cathode layer, a separator and an anode layer; wherein the separator is located between the cathode layer and the anode layer. and
2) adding the electrolyte as described herein to the stacked cathode layer, separator and anode layer.

In the stacking step, the cathode layer, the separator and the anode layer may be simply placed together without fixing with any physical or chemical means.

The method may further comprise, before the preparing step, the step of loading a cathode onto an aluminium foil to form the cathode layer. The loading step may comprise forming a slurry of the cathode and casting the cathode slurry on the aluminium foil to form the cathode layer. The cathode slurry may be formed by mixing the cathode with an organic solvent such as N-methylpyrrolidone (NMP) or other solvents known in the art that would be suitable for this purpose.

The method may further comprise, before the loading step, the step of mixing an NCM, a conductive additive and a polymer binder to form the cathode.

In the step of forming the cathode, the NCM and the conductive additive may be firstly mixed. Secondly, the binder may be added to the mixture of the NCM and conductive additive, together with the organic solvent, such as NMP, to form the slurry.

The electrolyte may be injected into the rechargeable battery after the stacking step.

The method may further comprise, after the preparing step, the step of enclosing the rechargeable battery in a case. The cathode layer may be connected to the cathode connection part (aluminium tab) and the anode layer may be connected to the anode connection part (nickel tab).

The cathode connection part and the anode connection part may be connected, for example with adhesive polymer tapes which may melt during heat press, to seal the anode and cathode together to form the case.

The stacked cathode layers and anode layers may be placed in a laminated bag comprising aluminium. The laminated bag may be the case. The electrolyte may then be injected into the laminated bag, to wet all the components within the bag.

The case of the pouch cell may be formed by the laminated aluminium bag, with the connection parts protruding from the case.

The method may further comprise, after the preparing step but before the enclosing step, the step of stacking multiple cathode layers, multiple separators and multiple anode layers. Here, the cathode layers and the anode layers may be placed in an alternating sequence and separated by the separators.

There may always be one more anode layer compared to the number of cathode layers. There may be 11 cathode layers and 12 anode layers.

In the stacking step, the multiple cathode layers, the multiple anode layers or the multiple separators may have a number in the range of about 2 to about 30, about 5 to about 25, about 10 to about 20, about 15 to about 20, about 2 to about 15, about 2 to about 10 or about 2 to about 5.

BRIEF DESCRIPTION OF DRAWINGS

The accompanying drawings illustrate a disclosed embodiment and serve to explain the principles of the disclosed embodiment. It is to be understood, however, that the drawings are designed for purposes of illustration only, and not as a definition of the limits of the invention.

(FIG. 9B). The cells were cycled at a constant current of 1 mA (or 0.25 C). The electrolyte consists of 1.5 or 2M LiDFOB dissolved in the solvent having PC, EC or FEC and DEC (7:3 by volume). The mass loading of NCM523 was 22±2 mg cm$^{-2}$. All the cells were tested at the voltage range from 2.8 V to 4.5 V. The cell with FEC solvent tested at 60° C. suffered the poorest cycling stability, resulted in the thermal decomposition of FEC.

(FIG. 11A), and an AC impedance spectrum of NCM523-Cu cells at 100% state of charge (SoC) (FIG. 11B). The cells were cycled at a constant current of 1 mA (or 0.25 C).

EXAMPLES

Figures 1A, 1B, 1C:
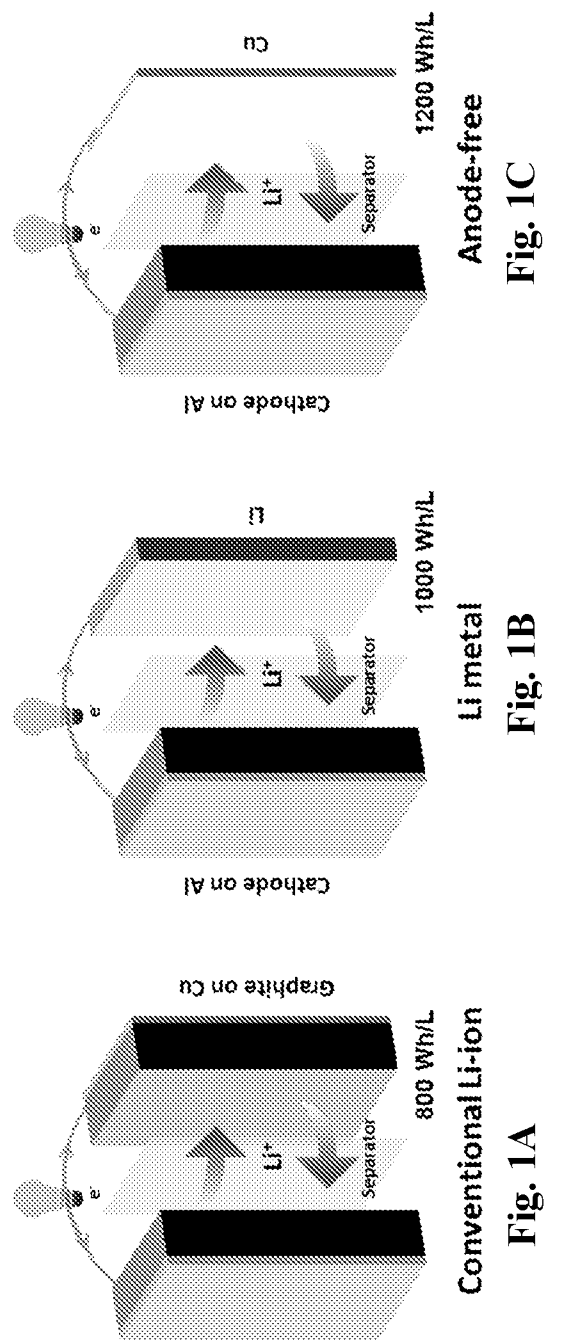
FIGS. 1A to 1C are schemes showing the cell configurations of conventional Li-ion (FIG. 1A), Li-metal (FIG. 1B) and anode-free batteries (FIG. 1C) known in the prior art.
Figure 2:
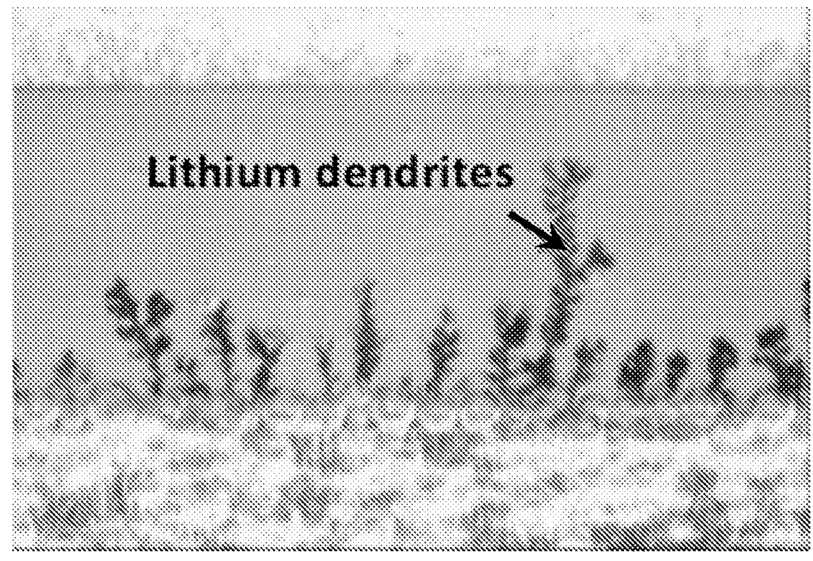
FIG. 2 refers to an image of lithium dendrites known in the prior art.

Non-limiting examples of the invention will be further described in greater detail by reference to specific Examples, which should not be construed as in any way limiting the scope of the invention.

Materials And Methods

Commercial cathode materials, $Li(Ni_{0.5}Co_{0.2}Mn_{0.3})O_2$ (NCM523) and $Li(Ni_{0.8}Co_{0.1}Mn_{0.1})O_2$ (NCM811), were purchased from LiBODE New Material Co., Ltd. (Yibin, Sichuan Province, China) and used without any further treatment. Except for $Li_2Cr_2O_7$ (synthesized by reacting $CrO_3$ and LiOH in stoichiometric ratio in water) and CsOTf (synthesized by reacting CsI and AgOTf in stoichiometric ratio in dimethyl carbonate), all the chemicals including lithium salts (LiBOB, LiDFOB, $LiBF_4$, $LiPF_6$, LiTFSI, LiOTf and $LiClO_4$), additive salts and anhydrous organic solvents were purchased from Merck KGaA (Darmstadt, Germany) unless otherwise indicated. LiBOB and LiDFOB were dried at 180° C. for 15 hours before transferring into an Ar-filled glovebox. Organic solvents were treated by 4 Å molecular sieve for 48 hours to further lower the moisture contamination.

All the cells were cycled on the Neware multi-channel battery tester (Neware Technology Limited, Shenzhen, China) at a constant current of 1 mA, in the voltage range from 2.8 to 4.5 V (vs. Li/Li$^+$). For the cells tested at evaluated temperatures, they were tested in a convection oven (Memmert GmbH+Co. KG, Schwabach, Germany) with precise temperature control.

Example 1: Preparation of the Cells

Electrode Preparation

Commercial cathode materials, $Li(Ni_{0.5}Co_{0.2}Mn_{0.3})O_2$ (NCM523) and $Li(Ni_{0.8}Co_{0.1}Mn_{0.1})O_2$ (NCM811) were used to fabricate the anode-free cell. 6.5 g of the cathode material was first mixed by a mixer (Thinky, ARE-310, Japan) with carbon black (Denka Company Limited, Tokyo, Japan) and polyvinylidene difluoride (PVDF) binder Solef® 5130 (Solvay, Brussels, Belgium) in a weight ratio of 90:5:5.

Then 5 ml of N-methylpyrrolidone (NMP) solvent was added into the composite and further mixed in the mixer to obtain a uniform cathode slurry. Subsequently, the slurry was evenly casted onto an aluminium foil by a doctor blade with a fixed gap. After drying at 120° C. for 1 hour and roll-to-roll heat press (Collins, Germany), the electrode was cut into a disk with a diameter of 12 mm for cell testing.

An NCM523/811 cathode was coated with a single side loading density of the cathode material of 20 mg/cm$^2$.

Electrolyte Preparation

Lithium difluoro(oxalate)borate (LiDFOB) was dissolved into a solvent with anhydrous propylene carbonate (or ethylene carbonate) and diethyl carbonate (all are from Sigma-Aldrich) in an Ar-filled glovebox. The ratios of the electrolytes in the solvents indicated in the experiments and the figures are in volumetric ratio. For ethylene carbonate (EC) with a melting point above room temperature, it was first melted at 60° C. and added based on the density at room temperature. To study the influence of salt concentration on battery cycling stability, a series of electrolytes with different lithium salt concentrations (from 0.5 M to above 2.0 M) were prepared.

Anode-Free Cell Preparation

An anode-free cell was assembled with Cu foil as the counter electrode with the electrolyte containing different lithium salts (LiBOB and LiDFOB) at different concentrations.

Type CR2032 coin cells were assembled for battery performance evaluation. The diameters of the cathode and Cu foil were 12 mm and 16 mm, respectively. Single side loading density of the NCM material was 20 mg/cm$^2$. Copper foil was from Wason Copper Foil Co., Ltd. (Lingbao, Henan, China), with a thickness of 6 μm.

For the pouch cell, NCM811 cathode was double-side coated on an aluminum foil with the area loading density of NCM811 active material of about 20 mg/cm$^2$. After drying, the cathode was cut into pieces having a 48 mm×70 mm dimension with a small connecting part at the top for Ni tab welding. The counter electrode was a 6 μm thick Cu foil with a dimension of 53 mm×75 mm, again with a small connecting part at the top for Al tab welding.

The relatively larger Cu foil was used to hold all the lithium during charging. The electrolyte consisted of 2M LiDFOB dissolved in PC and DEC with a volume ratio of 7:3. In total, 11 layers of cathode and 12 layers of Cu foil were alternately stacked and sandwiched (and thus separated) by Celgard K2045 (20 μm monolayer polyethylene) separators (Celgard LLC, Charlotte, North Carolina, USA).

The stacked electrodes were placed in a laminated aluminium bag, which is the casing of the pouch cell, and then the electrolytes were injected into the aluminium bag, to wet all the components within the bag.

The nomenclature "NCM523-Cu cell" refers to a cell where NCM523 is used as the cathode material and Cu is used as the counter electrode. "NCM811-Cu cell" is construed accordingly.

Lithium Metal Cell Preparation

To construct lithium metal cells, the copper foils were replaced by lithium metal (diameter: 15.8 mm, thickness: 0.2 mm) from China Energy Lithium Co., Ltd. (Tianjin City, China).

Example 2: Battery Performance

2M LiDFOB Dissolved in Propylene Carbonate (PC) and Diethyl Carbonate (DEC) at Different Volume Ratios Fluoroethylene carbonate (FEC) has been widely used as an electrolyte additive to enhance the formation of solid electrolyte interface and to improve Li-ion battery cycling stability at room temperature. However, electrolytes containing FEC suffers from poor stability at higher temperatures (e.g., at 60° C.). In fact, the optimal storage temperature of FEC recommended by Sigma-Aldrich is 2-8° C. On the other hand, a slightly higher temperature is beneficial for lithium mass transfer in the electrolyte and to facilitate smooth lithium plating on Cu.

Figure 3:
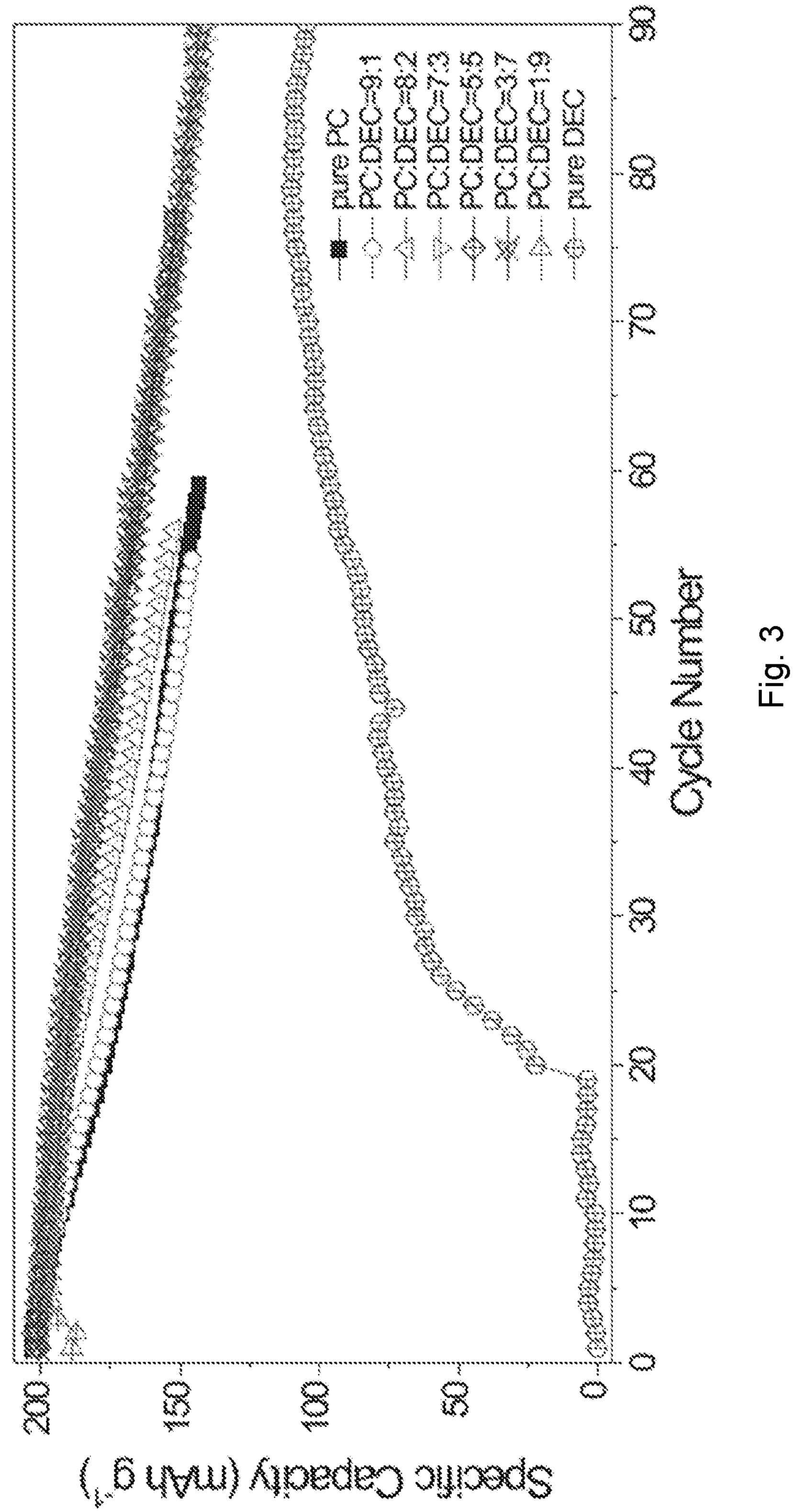
FIG. 3 is a graph showing the cycling performance of NCM523-Cu cells with 2M LiDFOB dissolved in electrolytes having different ratios of PC/DEC. The cells were cycled at a constant current of 1 mA (or 0.25 C) with a cut-off voltage of 2.8 V to 4.5 V at 60° C. The mass loading of NCM523 was 22±2 mg $cm^{-2}$.
Figure 4:
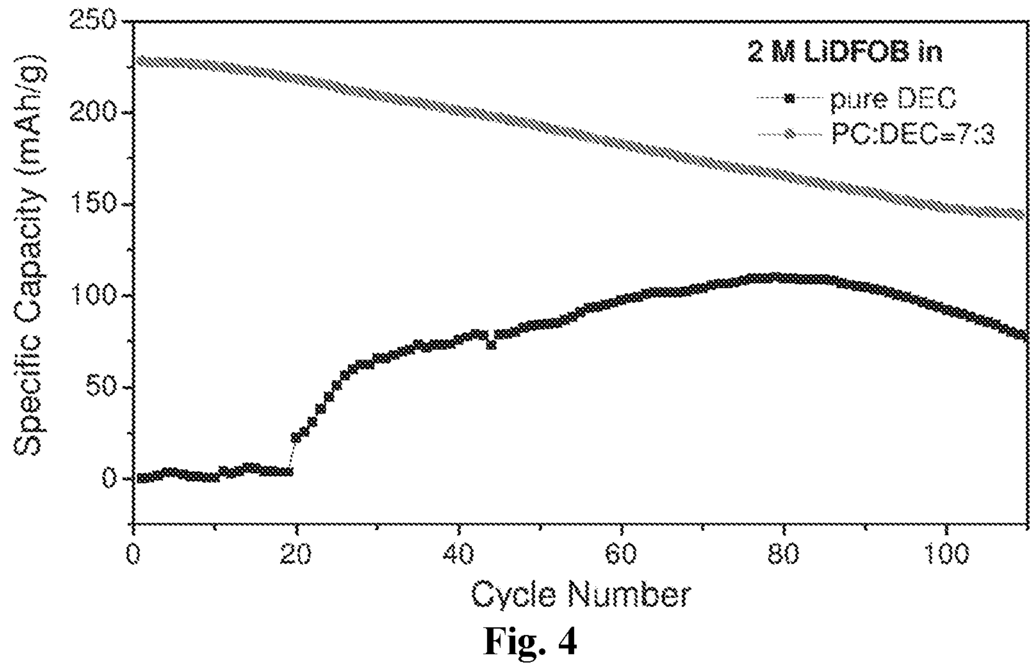
FIG. 4 is a graph showing the cycling performance of NCM523-Cu cells with 2M LiDFOB dissolved in pure DEC or at a PC:DEC ratio of 7:3, indicating the cycle number from 90 to 110. The cells were cycled at a constant current of 1 mA (or 0.25 C) with a cut-off voltage of 2.8 V to 4.5 V at 60° C. The mass loading of NCM523 was 22±2 mg $cm^{-2}$.

In this regard, the electrolyte disclosed herein comprises a thermally stable propylene carbonate (PC). 2M lithium difluoro(oxalate)borate (LiDFOB) was dissolved into solvents with different volume ratios of PC and diethyl carbonate (DEC). The cycling performance of the anode-free cells with NCM523 cathode and Cu as the counter electrode is shown in FIG. 3. A smaller slope of the cycling curve indicates a better cycling stability of the cells. At high PC ratios (PC:DEC≥8:2) or using pure DEC as the solvent, the cells displayed faster capacity fading and poorer cycling stability. It should be noted that the increase in specific capacity observed with increase cycle numbers in the electrolyte comprising 2 M LiDFOB and pure DEC in FIG. 3 is abnormal. After 90 cycles, the cell suffers faster capacity loss, as shown in FIG. 4. A good cell should exhibit a stable performance with almost linear capacity loss.

The optimal ratios of PC and DEC for the anode-free battery should be around 7:3 to 1:9. The solvent with a PC/DEC ratio of 7:3 was preferred for further use for having a high flash point (132° C. vs. 33° C. for DEC) and boiling point (242° C. vs. 125.8° C. for DEC) of PC, which may improve battery safety.

Effect of Concentrated LiDFOB in EC/DEC=7:3 and PC:DEC=7:3

Figure 5:
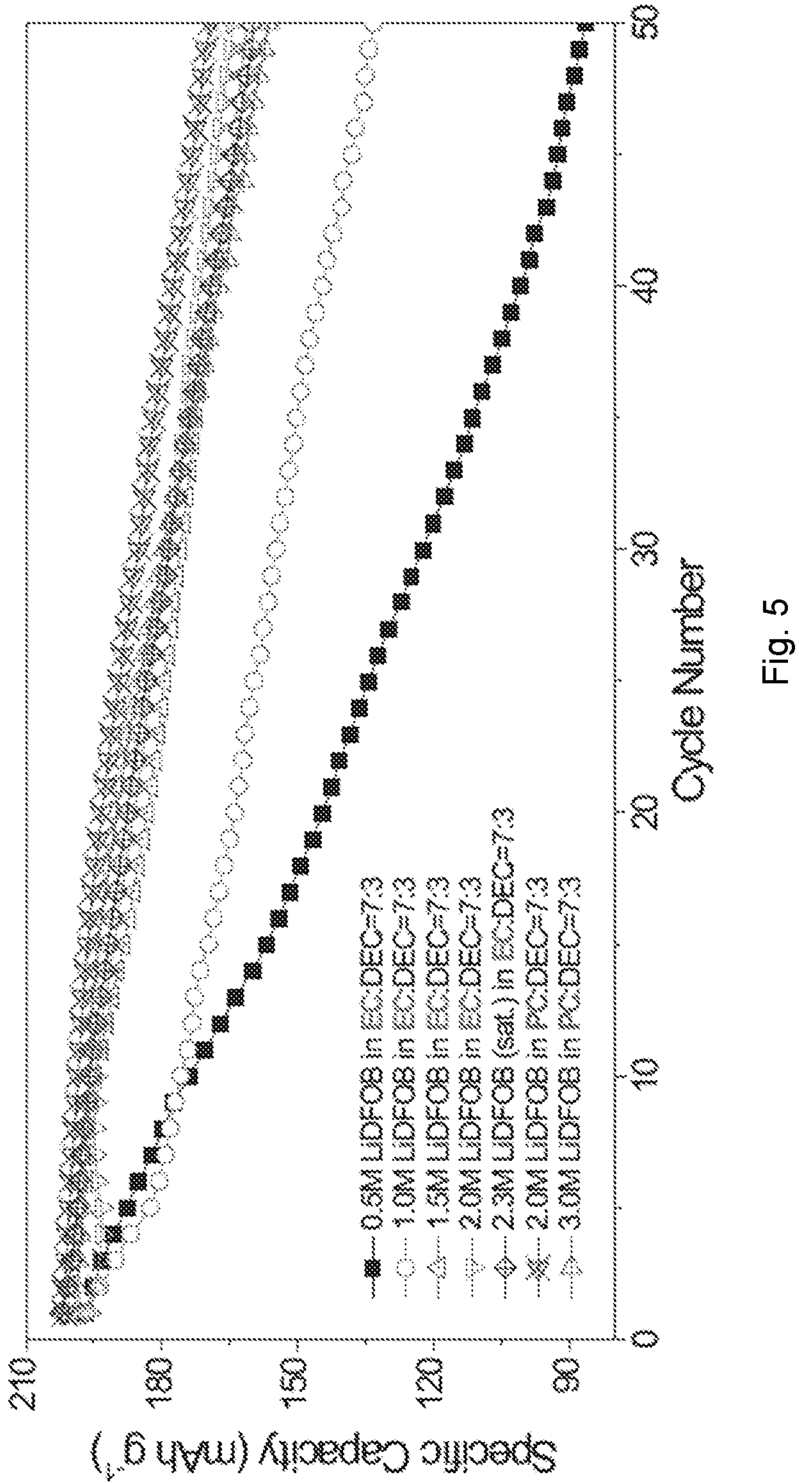
FIG. 5 is a graph showing the cycling performance of NCM523-Cu cells with different concentrations of LiDFOB in EC/DEC and PC/DEC electrolytes (with a fixed ratio of 7:3). The cells were cycled at a constant current of 1 mA (or 0.25 C) with a cut-off voltage of 2.8 V to 4.5 V at 60° C. The mass loading of NCM523 was 22±2 mg $cm^{-2}$.

The cycling stability of the anode-free cell was found to be improved by optimizing the concentration of LiDFOB. The ratio of the cyclic carbonate (ethylene carbonate (EC) or PC) and DEC was fixed at 7:3 and the effect of LiDFOB concentrations on cycling stability was investigated, as shown in FIG. 5. At low concentrations (0.5 M and 1.0 M), the equipped cells exhibited faster performance decay. For example, after 50 cycles, the cell with 0.5 M LiDFOB could only retain a specific capacity of no more than 90 mAh/g. Increasing the concentration of LiDFOB to 1.0 M resulted in a higher capacity retention to 133 mAh/g after the same numbers of cycles. Even better battery performance was observed in the cells using concentrated LiDFOB (≥1.5 M) with a capacity loss of less than 20% after 50 cycles. Though LiDFOB has higher solubility in PC-based electrolytes (>3.0 M), an over-concentrated electrolyte may affect Li-ion diffusion due to its high viscosity. The optimal electrolyte recipe was therefore 2.0 M LiDFOB in PC:DEC=7:3.

For completeness, the cyclic performance of cells using LiBOB (lithium bis(oxalate)borate) was also studied (FIG. 5). While LiBOB did display a reasonable cycling performance, its solubility in the carbonate solvent was found to be low (about 1.3 M), hence only a concentration of 0.5 M and 1.0 M was tested.

Effect of Area Loading

Figure 6:
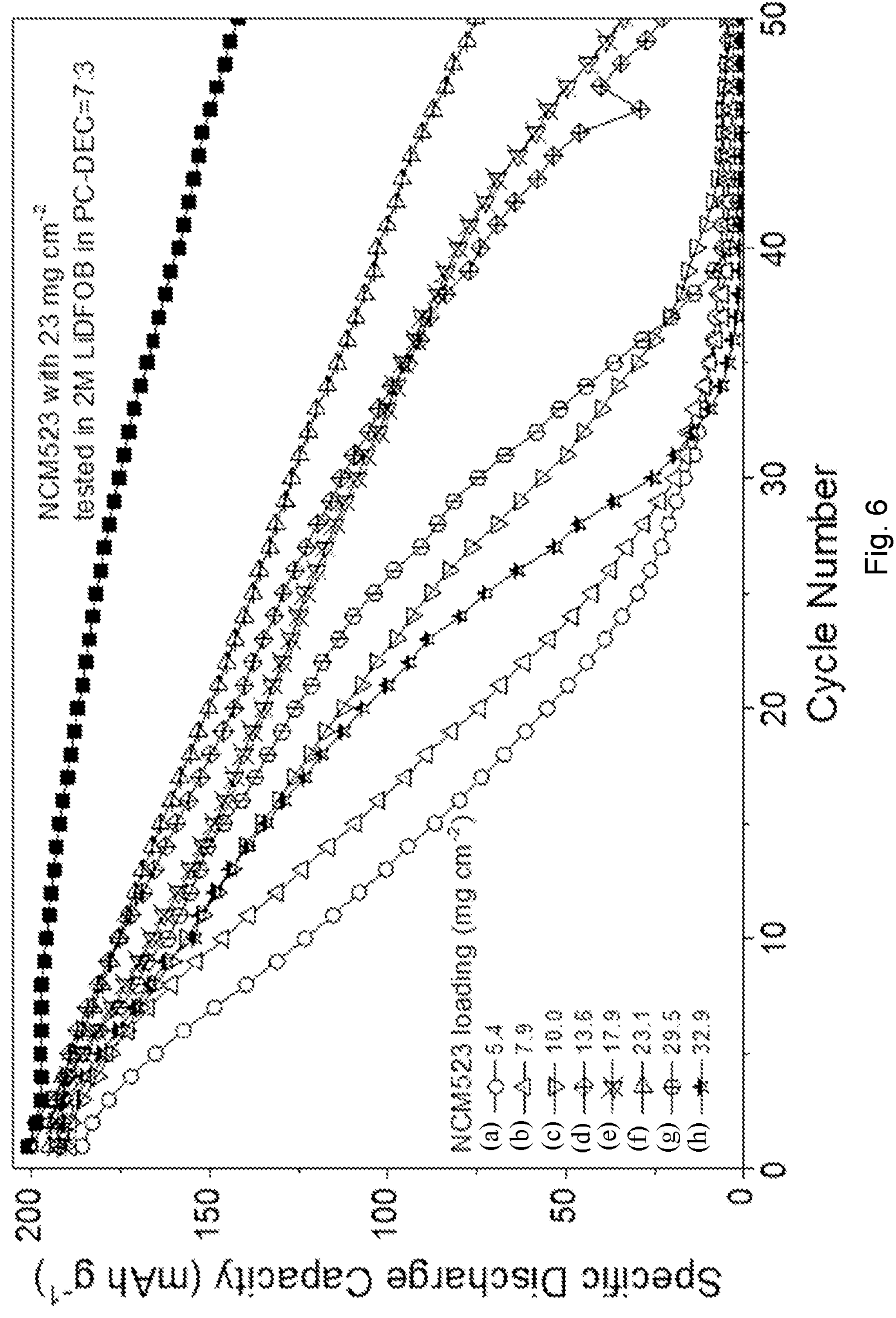
FIG. 6 refers to graphs showing a comparison between the cycling performance of NCM523-Cu cells with different area loading density, (a) 5.4, (b) 7.9, (c) 10, (d) 13.6, (e) 17.9, (f) 23.1, (g) 29.5, and (h) 32.9 mg/cm$^2$. The electrolyte consists of 1 M $LiPF_6$ in EC/DEC (1:1, v/v). The cells were cycled at a constant current of 1 mA (or 0.25 C) at room temperature. The black solid squares show the cycling data of NCM523 electrode (23 mg cm$^{-2}$) tested in the electrolyte with 2M LiDFOB dissolved in PC:DEC=7:3 by v/v at 60° C. All the cells were tested at the voltage range from 2.8 V to 4.5 V.

To emphasize the necessity of using the inventive electrolyte for improved cycling stability, the effect of different area loading of NCM523 cathode was tested (FIG. 6) in a conventional electrolyte (1M $LiPF_6$ in EC-DEC=1:1) at the room temperature (applied current: 0.2 mA, cut-off voltage: 2.8-4.5 V). The electrode with areal NCM523 loading of 23.1 mg cm$^{-2}$ showed the best cycling stability among all the cells with the same electrolyte. However, the cycling stability was still far poorer than the electrode tested in the electrolyte comprising 2M LiDFOB in PC-DEC=7:3 (applied current: 0.2 mA, cut-off voltage: 2.8-4.5 V) evaluated at 60° C.

Effect of Separators

Figure 7:
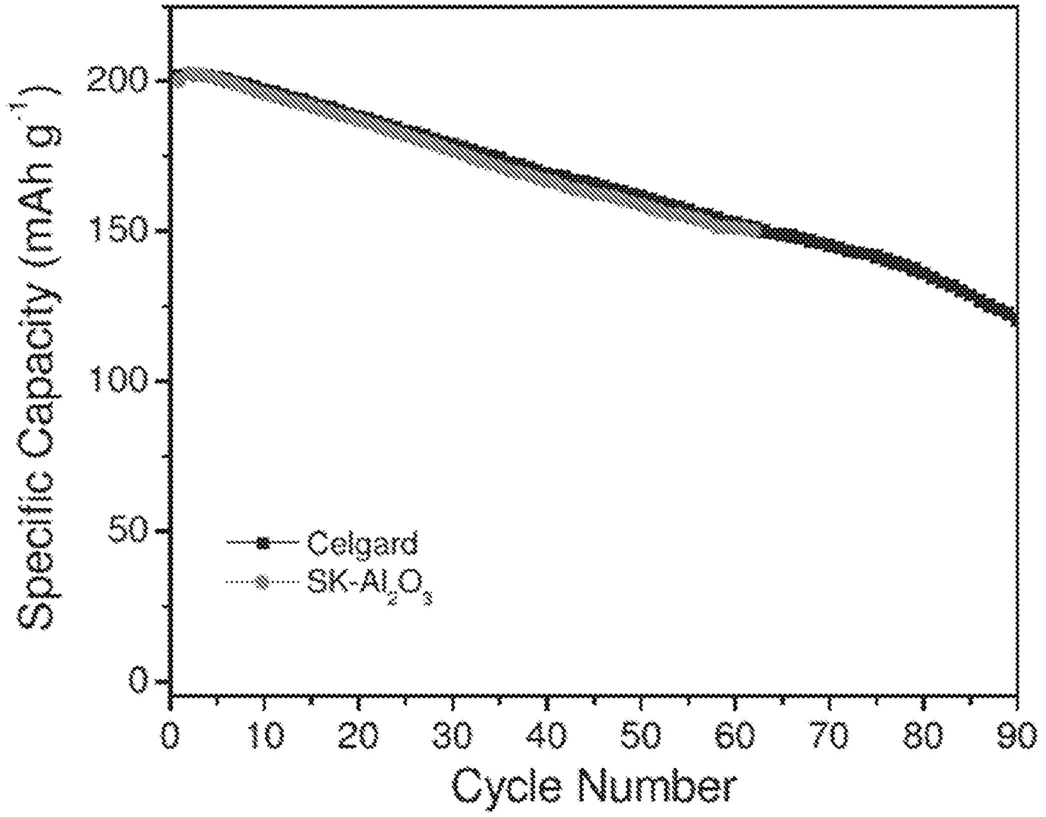
FIG. 7 refers to a graphs showing the cycling performance of NCM523-Cu cells with 2M LiDFOB in EC:DEC=7:3 tested at 60° C. and with two different separators, Celgard K2045 and SKIET with $Al_2O_3$ coating. The cells were cycled at a constant current of 1 mA (or 0.25 C) at 60° C. The mass loading of NCM523 was 22±2 mg cm$^{-2}$. All the cells were tested at the voltage range from 2.8 V to 4.5 V.

The effect of using a different separator, namely Celgard separator K2045 or a separator from SK IE Technology with $Al_2O_3$ coating in a NCM523-Cu was tested (FIG. 7). The difference in performance between the two separators was negligible, suggesting that the type of separator does not significantly affect the performance of the cell.

Effect of Additional Salts

Figures 8A, 8B, 8C:
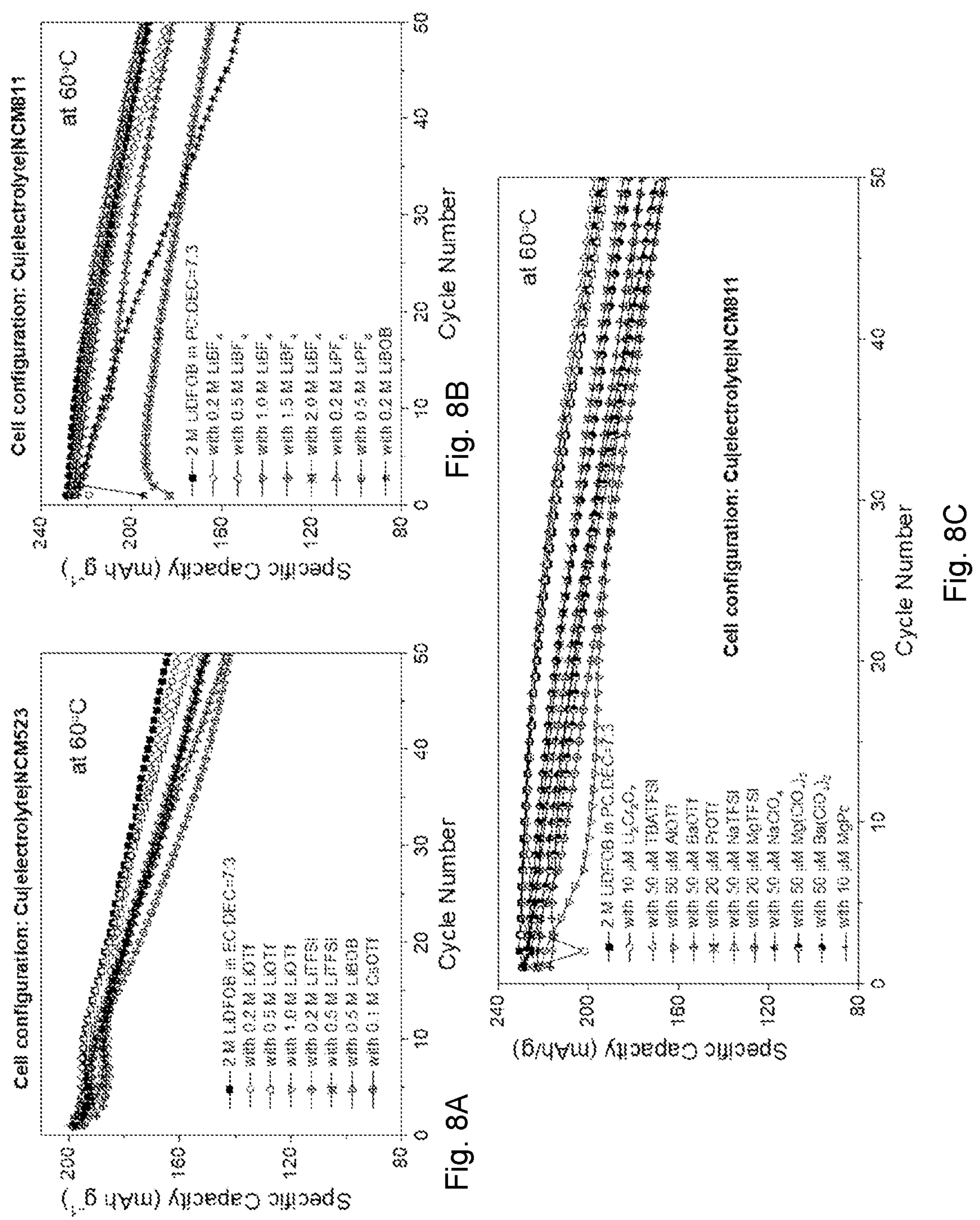
FIGS. 8A to 8C are graphs showing the cycling performance of NCM523-Cu cells in the presence of various amounts of Li salts (FIG. 8A), NCM811-Cu cells in the presence of various amounts of Li and non-Li salts (FIG. 8B), and NCM811-Cu cells in the presence of various amounts of Li and non-Li salts (FIG. 8C), all with 2M LiDFOB in EC:DEC=7:3 and tested at 60° C. The cells were cycled at a constant current of 1 mA (or 0.25 C) at 60° C. The mass loading of NCM523 and NCM811 was 22±2 mg cm$^{-2}$. All the cells were tested at the voltage range from 2.8 V to 4.5 V.

The effect of additional salts on the cycling performance of NCM523 cathode and NCM811 cells were tested (FIGS. 8A to 8C). FIG. 8A shows NCM523-Cu cells in the presence of various amounts of LiOTf, LiTFSI, LiBOB and CsOTf, FIG. 8B shows NCM811-Cu cells in the presence of various amounts of $LiBF_4$, $LiPF_6$ and LiBOB, and FIG. 8C shows NCM811-Cu cells in the presence of various amounts of $Li_2Cr_2O_7$, TBATFSI, AlOTf, BaOTf, PrOTf, NaTFSI, MgTFSI, $NaClO_4$, $Mg(ClO_4)_2$, $Ba(ClO_4)_2$ and MgPc. These figures show that the presence or type of additional salts do not significantly affect the cycling performance of the cells.

Effect of Temperature

Figures 9A, 9B:
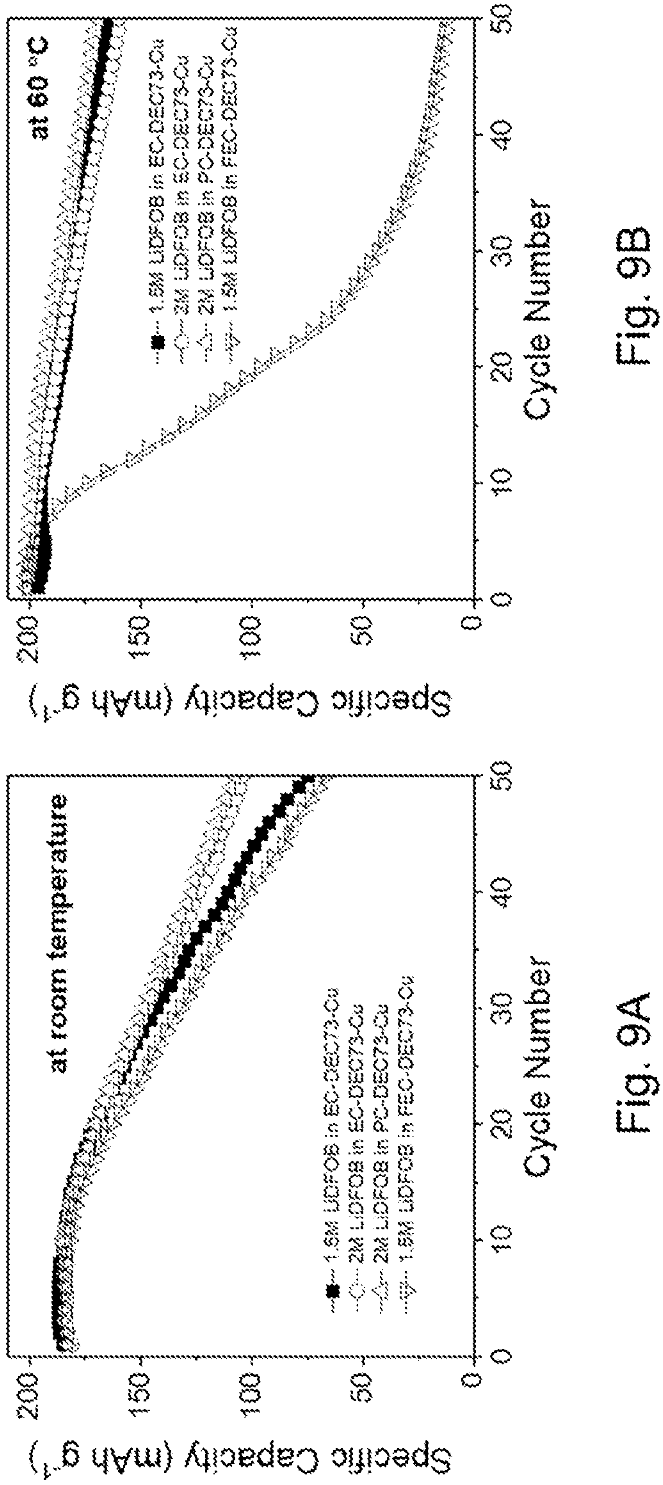
FIGS. 9A and 9B are graphs showing a comparison between the cycling performance of NCM523-Cu cells in different concentrations of LiDFOB at room temperature (FIG. 9A) and 60° C.

The cyclic performance of the cells at different temperatures (room temperature and 60° C.) at different concentrations of LiDFOB and different solvents, was tested (FIGS. 9A and 9B). The solubility of LiDFOB in FEC/DEC (7:3 v/v) was only 1.5 M. Replacing EC/PC with FEC worsened the cycling stability, especially for the cells tested at 60° C. due to the poor thermal stability of FEC.

Figures 10A, 10B:
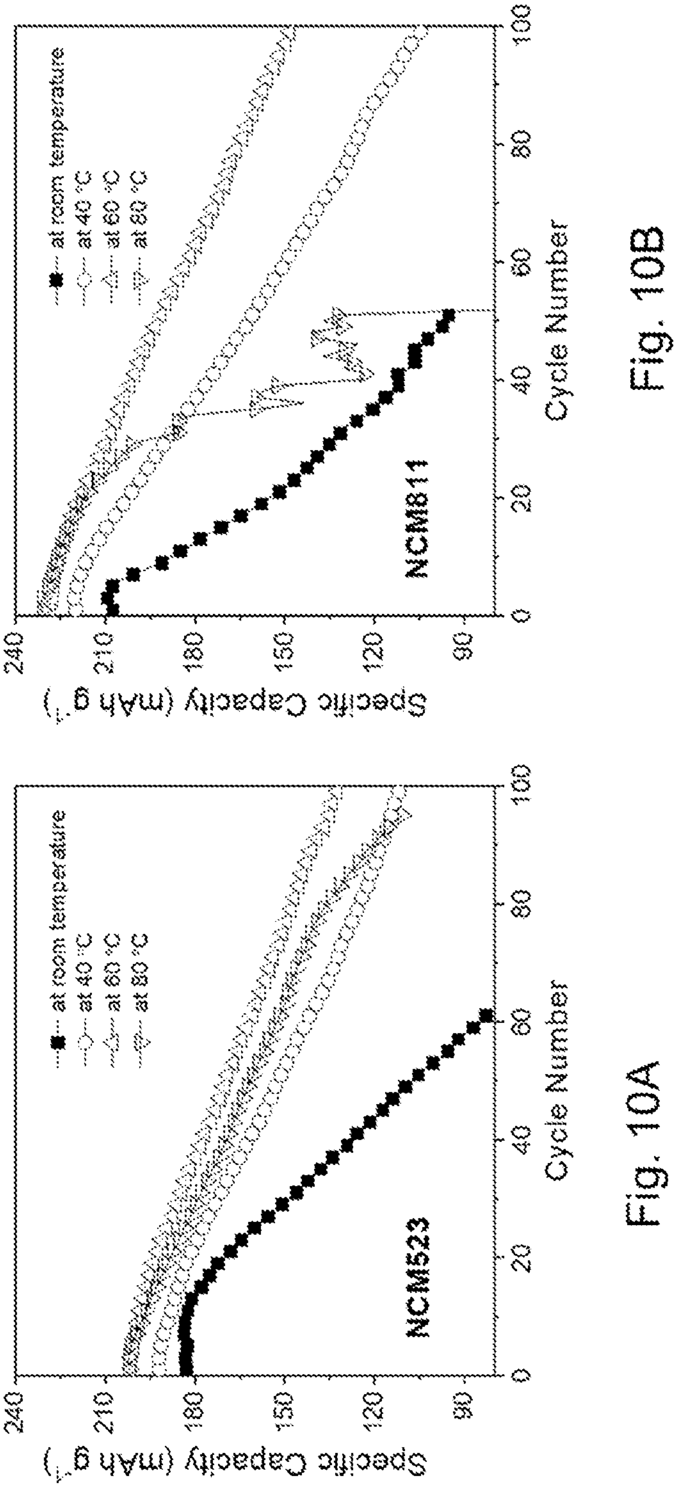
FIGS. 10A and 10B are graphs showing a comparison between the cycling performance of NCM523-Cu cells (FIG. 10A) and NCM811-Cu cells (FIG. 10B) at different temperatures ranging from room temperature, 40° C., 60° C. and 80° C. The cells were cycled at a constant current of 1 mA (or 0.25 C). The electrolyte consists of 2M LiDFOB dissolved in the solvent with PC and DEC (7:3 by volume). The mass loading of NCM523 and NCM811 was 22±2 mg cm$^{-2}$. All the cells were tested at the voltage range from 2.8 V to 4.5 V.

An elevated temperature was able to enhance lithium mass transfer and thus improve lithium plating for better cycling stability, evidenced by the improvement of cycling performance of NCM523 cells over the temperature range of from room temperature to 60° C. (FIG. 10A).

However, when the operation temperature is 80° C., the side reactions, for example the dissolution of transition metal ions at the cathode, or anode erosion caused by electrolyte decomposition, become dominant and result in fast capacity fading during cycling. This adverse effect at higher temperatures was observed in both cells with NCM523 and NCM811 cathodes. Due to the poorer structural stability after delithiation, the cell with NCM811 cycled at 80° C. suffered faster capacity fading than the cell with NCM523 (FIG. 10B).

Figures 11A, 11B:
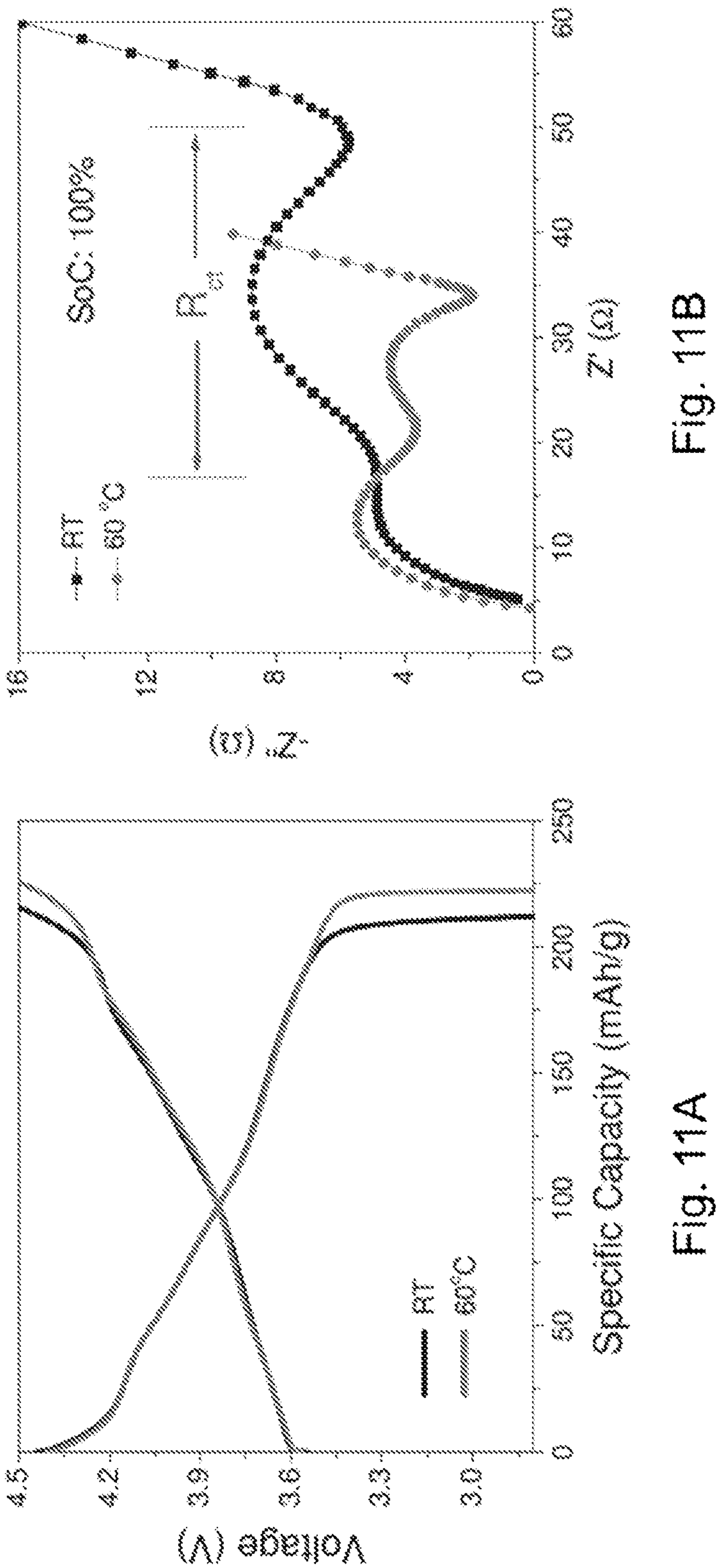
FIGS. 11A and 11B are graphs showing a voltage profile (third cycle) of NCM523-Cu cells at room temperature (RT) and at 60° C.
Figures 12A, 12B, 12C, 12D:
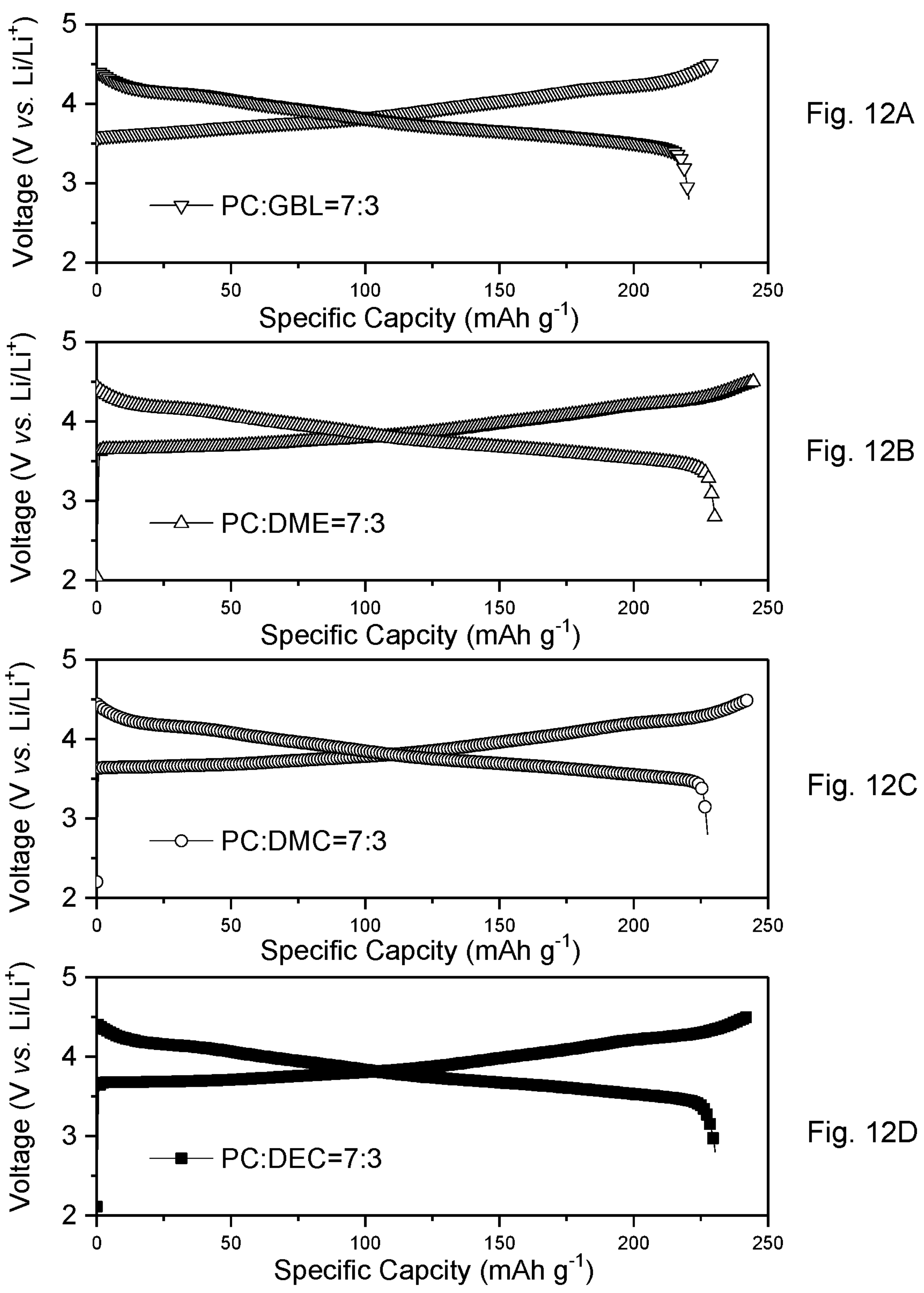
FIGS. 12A to 12D are graphs showing voltage profiles (first cycle) of NCM811-Cu cells with 2 M LiDFOB in different electrolyte solvents. 70 volume % of PC was mixed with 30 volume % of gamma-butyrolactone (GBL) (FIG. 12A), 1,2-dimethyoxyethane (DME) (FIG. 12B), dimethyl carbonate (DMC) (FIG. 12C) and diethyl carbonate (DEC) (FIG. 12D), respectively. The cells were cycled at a constant current of 1 mA (or 0.25 C). The mass loading of NCM811 was 22±2 mg cm$^{-2}$.

Nonetheless, the replacement of NCM523 with NCM811 was shown to boost the specific capacity from 200 to 230 mAh/g (FIGS. 11A and 11B, data at 60° C.). FIG. 11A shows that the NCM523 cell at 60° C. is able to deliver higher specific capacity than the cell at room temperature (RT) (222 vs. 212 mAh/g). FIG. 11B shows that the cell operating at 60° C. had a smooth and dense lithium layer, evidenced by smaller charge transfer resistance ($R_{ct}$) of 12.6 compared to 41.2 of the cell operating at RT at 100% state of charge (SoC). A lower $R_{ct}$ of the cell is correlated with a higher quality of a plated lithium film and higher performance of the cell.

Effect of Co-Solvents

FIGS. 12A to 12D show the effect of different co-solvents diethyl carbonate (DEC), dimethyl carbonate (DMC), gamma-butyrolactone (GBL) and 1,2-dimethyoxyethane (DME) with 30 volume % in PC (2M LiDFOB was dissolved as the conducting salt), on the voltage profile in the first cycle of the cell using NCM811 cathode. The figures show that presence of type of co-solvents do not significantly affect the performance of the cell NCM811 Cathode When cycled at the optimal operation temperature of 60° C., the cell with NCM523 was able to retain a specific discharge capacity of 133 mAh/g (or 66.5% of its initial capacity), which is slightly lower than the cell with NCM811 (148 mAh/g or 64.3%).

Because of the high capacity and similar capacity retention at the optimal operation temperature of the cell having a NCM811 cathode, NCM811 was used as the cathode in the subsequent high-energy prototype anode-free cell assembly.

Example 3: Comparison of Anode-Free and Lithium Metal Cells

Since in an anode-free lithium battery, all the lithium sources are from the NCM cathode, the side-reactions at the interface between the electrode and the electrolyte (oxidation at cathode and reduction at anode) and the formation of "dead" lithium during plating/stripping inevitably caused a loss of active lithium and thus the deterioration of battery cycling stability.

Figure 13:
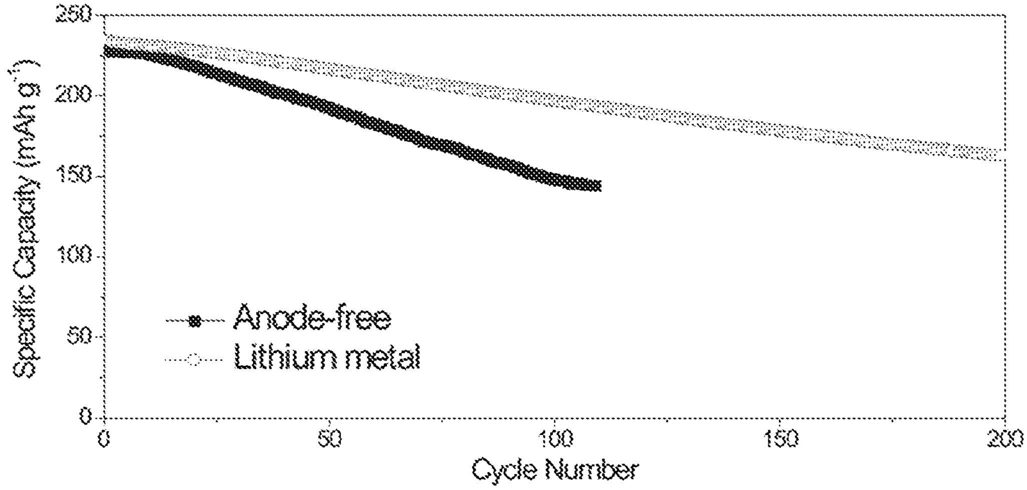
FIG. 13 refers to a graph comparing the cycling performance of an anode-free NCM811-Cu cells (open circles) with a lithium metal cell (filled squares). The cells were cycled at a constant current of 1 mA (or 0.25 C) at 60° C. with 2M LiDFOB dissolved in PC and DEC (7:3 by volume). The mass loading of NCM811 was 22±2 mg cm$^{-2}$. Both the cells were tested at the voltage range from 2.8 V to 4.5 V.

To compensate for lithium loss, a general method was to introduce some lithium metal at the anode, which was achieved by using an ultra-thin lithium metal or other lithium-active species, which was able to provide additional lithium sources during cell operation. The cell with lithium metal showed improved cycling stability with a capacity retention rate of 70.7% after 200 cycles (FIG. 13). As a comparison, the anode-free cell only kept 64.6% of its initial capacity after merely 100 cycles.

Nonetheless, the poor mechanical property and the highly active nature of lithium foil complicated the cell manufacturing processes. The presence of an excessive lithium source (in the form of lithium metal) also raised safety concerns and may hinder the industrial adoption of lithium metal rechargeable battery.

Example 4: Comparison with a Dual-Salt Electrolyte System

Figures 14A, 14B:
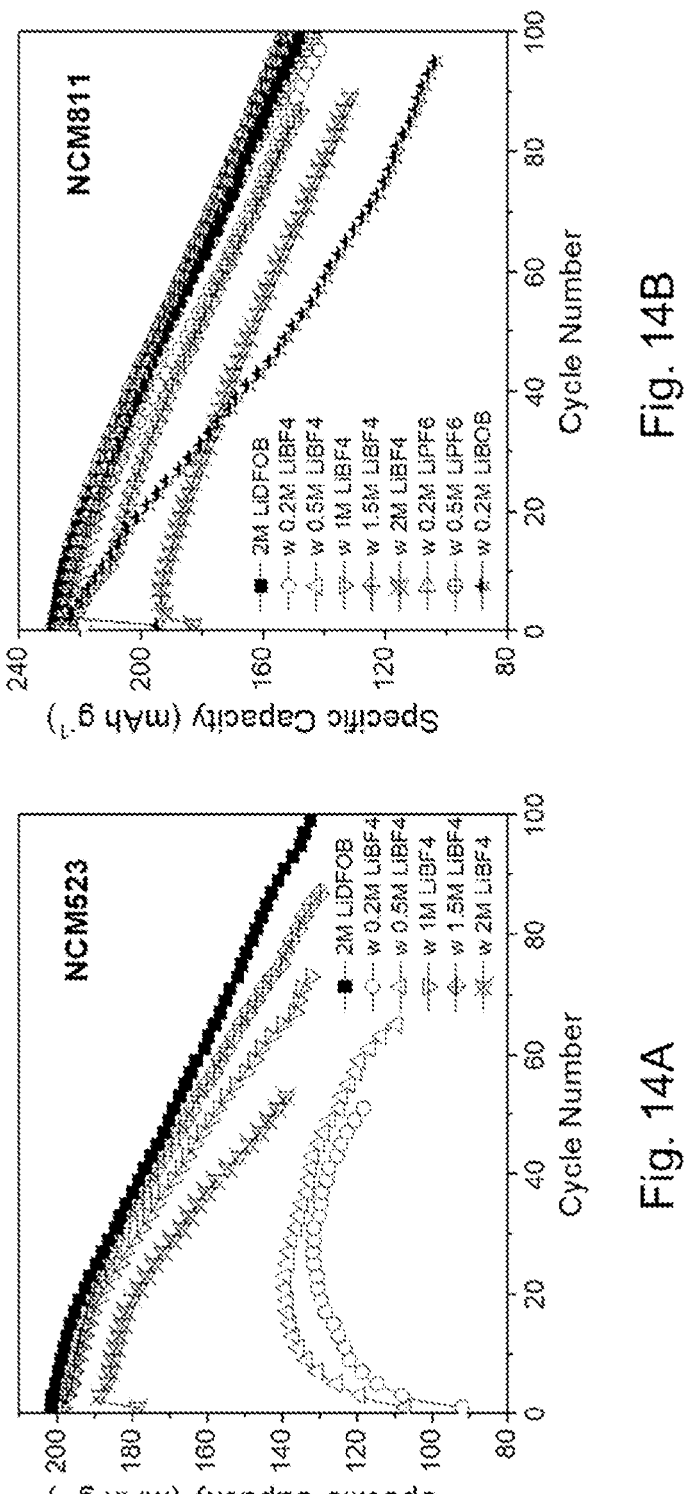
FIGS. 14A and 14B are graphs showing the cycling performance of NCM523-Cu cells (FIG. 14A) and NCM811-Cu cells (FIG. 14B) with a secondary lithium salt at different concentrations. The cells were cycled at a constant current of 1 mA (or 0.25 C) at 60° C. with 2M LiDFOB dissolved in PC and DEC (7:3 by volume). The mass loading of NCM523 and NCM811 was 22±2 mg cm$^{-2}$. All the cells were tested at the voltage range from 2.8 V to 4.5 V.

The cycling performance of the cells with 2M LiDFOB with and without the secondary lithium salt ($LiBF_4$, $LiPF_6$ and LiBOB) was investigated, as shown in FIGS. 14A and 14B. In the electrolyte system disclosed herein (2M LiDFOB in PC-DEC solvent), the addition of a secondary lithium salt did not significantly improve the cycling stability of any of the cells having a NCM523 and NCM811 cathode. Based on cost considerations, it would appear that the use of a dual-salt electrolyte system in these cells is not necessary. It is noteworthy that the replacement of FEC with PC not only reduced the electrolyte cost, but also ensured that the cells can be operated at a higher temperature (60° C.), which is the key for smooth lithium plating during operation.

Example 5: Assembly of a Prototype 2.8 Ah Anode-Free Pouch Cell

Figures 15A, 15B:
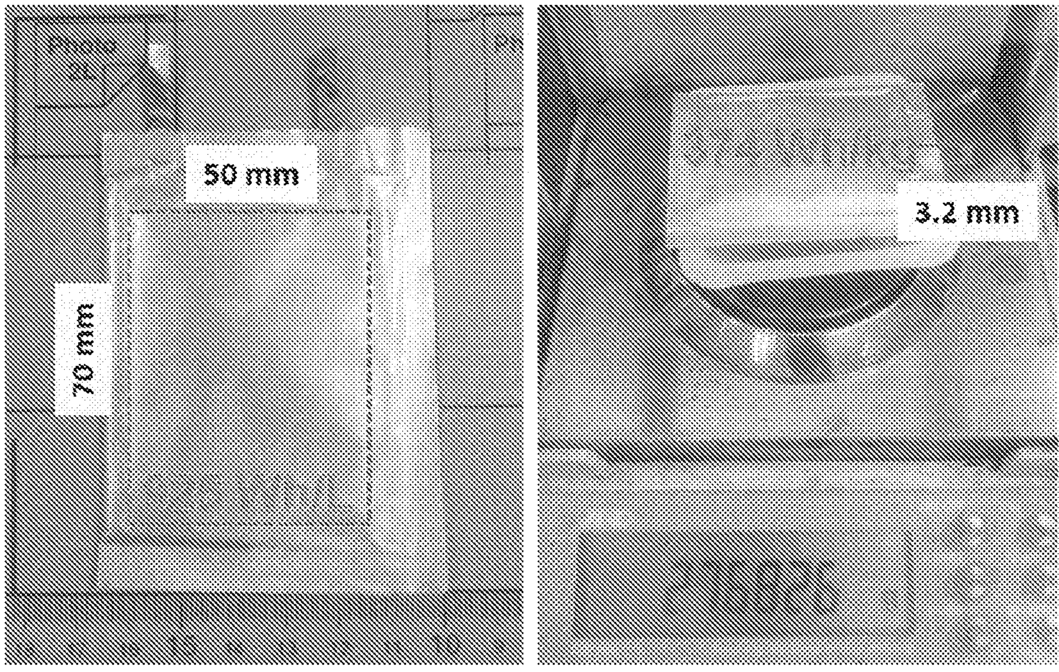
FIGS. 15A and 15B are photographs of the prototype 2.8 Ah anode-free pouch cell, showing practical energy density (FIG. 15A) and specific energy (FIG. 15B).

The energy density of the anode-free cell was evaluated in a pouch cell. When operated at 60° C., the pouch cell was able to deliver a reversible capacity of 2.8 Ah, with a practical energy density of 925 Wh/L or a specific energy of 374 Wh/kg, as shown in FIG. 15A and FIG. 15B, respectively.

INDUSTRIAL APPLICABILITY

The electrolyte as defined herein may have applications in a rechargeable battery. The rechargeable battery as defined herein may be useful as a battery for portable devices such as mobile phones, smart phones, laptops, tablets, digital cameras, camcorders, electronic cigarettes, handheld game consoles and flashlights, in vehicles such as cars and motorcycles, in electric vehicles such as electric cars, hybrid vehicles, electric motorcycles and scooters, electric bicycles, personal transporters, electric wheelchairs, radio-controlled models, model aircraft, drones and other electric take-off and landing vehicles, as well in urban aviation, such as in aircraft. The rechargeable battery as defined herein may also be useful in telecommunication and other energy storage systems.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. An electrolyte comprising lithium difluoro(oxalate) borate (LiDFOB), an additional salt and a carbonate solvent, wherein LiDFOB is present at a concentration in the range of 1.5 M to 3 M, and wherein the electrolyte does not comprise lithium salts other than LiDFOB.

2. The electrolyte according to claim 1, wherein the carbonate solvent is a cyclic carbonate solvent, a non-fluorinated cyclic carbonate solvent or an ethylene carbonate wherein the carbon atoms of the ethylene group in the ethylene carbonate are independently optionally substituted with an alkyl group.

3. The electrolyte according to claim 1, further comprising a co- solvent.

4. The electrolyte according to claim 3, wherein the co-solvent is selected from the group consisting of an acyclic carbonate, an ester, an ether and any mixture thereof, that is each miscible with the carbonate, or the solvent and the co-solvent have a volume ratio in the range of about 8:2 to about 1:9.

5. The electrolyte according to claim 1, wherein a concentration of the additional salt is in the range of about 10 μM to about 2 M.

6. The electrolyte according to claim 1, wherein the electrolyte has a water content in the range of 0 ppm to 1000 ppm.

7. A rechargeable battery comprising: an electrolyte comprising lithium difluoro (oxalate) borate (LiDFOB), an additional salt and a carbonate solvent, wherein LiDFOB is present at a concentration in the range of 1.5 M to 3 M, and wherein the electrolyte does not comprise lithium salts other than LiDFOB, a cathode layer, an anode layer and a separator.

8. The rechargeable battery according to claim 7, further comprising a case.

9. The rechargeable battery according to claim 7, wherein the cathode layer comprises a cathode, and an aluminium foil or a conductive mesh.

10. The rechargeable battery according to claim 9, wherein the cathode comprises a cathode material, a conductive additive and a polymer binder.

11. The rechargeable battery according to claim 10, wherein the cathode material is selected from the group consisting of nickel cobalt manganese oxides (NCM), nickel cobalt aluminium oxides (NCA), lithium cobalt oxide, lithium manganese oxide, lithium iron phosphate and any combination thereof, the conductive additive is selected from the group consisting of carbon black, carbon nanotubes, graphene and any combination thereof, or the polymer binder is selected from the group consisting of polyvinylidene fluoride (PVDF), poly-o-methoxyaniline (POMA), poly (3,4-ethylenedioxythiophene) (PEDOT), polyaniline (PANI), polyacrylonitrile (PAN), poly (acrylic acid) (PAA) and any combination thereof.

12. The rechargeable battery according to claim 7, wherein the anode layer comprises copper, nickel, titanium, stainless steel, lithium or a mixture thereof.

13. The rechargeable battery according to claim 7, wherein the rechargeable battery comprises multiple cathode layers, multiple anode layers and multiple separators.

14. A method of preparing an electrolyte comprising lithium difluoro (oxalate) borate (LiDFOB), an additional salt and a carbonate solvent, wherein LiDFOB is present at a concentration in the range of 1.5 M to 3M, and wherein the electrolyte does not comprise lithium salts other than LiDFOB, comprising a step of dissolving LiDFOB in a carbonate solvent and adding an additional salt before or after the dissolving step.

15. The method according to claim 14, further comprising a step of drying the LiDFOB or the carbonate solvent before the dissolving step.

16. The method according to claim 15, wherein in the drying step, the LiDFOB is heated at a temperature of at least 120° C. for a duration of at least 5 hours, or the carbonate solvent is dried with a desiccant for a duration of at least 48 hours.

17. The method according to claim 14, further comprising a mixing step before the dissolving step, wherein the carbonate solvent is mixed with a co-solvent.

* * * * *